(12) United States Patent
Chang

(10) Patent No.: US 6,940,489 B2
(45) Date of Patent: Sep. 6, 2005

(54) AMELIORATION OF MOUSE BUTTON STRUCTURE

(76) Inventor: Chin-Sung Chang, P.O. Box No. 6-57, Chung-Ho, Taipei 235 (TW)

(*) Notice: Subject to any disclaimer, the term of this patent is extended or adjusted under 35 U.S.C. 154(b) by 277 days.

(21) Appl. No.: 10/323,786

(22) Filed: Dec. 20, 2002

(65) Prior Publication Data

US 2004/0119691 A1 Jun. 24, 2004

(51) Int. Cl.[7] .............................. G09G 5/08
(52) U.S. Cl. .............................. 345/163; 345/156
(58) Field of Search ............... 345/163–167, 345/156, 157; D14/402–410

(56) References Cited

U.S. PATENT DOCUMENTS

| | | | | |
|---|---|---|---|---|
| D370,219 S | * | 5/1996 | Blumer et al. | D14/403 |
| D387,338 S | * | 12/1997 | Leifer | D14/403 |
| D442,965 S | * | 5/2001 | Cecilia et al. | D14/440 |
| 6,256,015 B1 | * | 7/2001 | Adler | 345/163 |
| 6,338,884 B1 | * | 1/2002 | Chang | 428/13 |
| 6,373,467 B1 | * | 4/2002 | Slowinski et al. | 345/163 |
| 6,429,851 B1 | * | 8/2002 | Vaghefi et al. | 345/163 |
| 6,609,942 B1 | * | 8/2003 | Cole et al. | 446/77 |
| 2002/0126093 A1 | * | 9/2002 | Smith et al. | 345/163 |

* cited by examiner

*Primary Examiner*—Xiao Wu
(74) *Attorney, Agent, or Firm*—Troxell Law Office, PLLC

(57) ABSTRACT

An amelioration of a mouse button structure mainly comprises an arched main body suitable for the grasp of the human hand; the main body is provided with at least two buttons on the top and two containers at the top end having openings leading to an interior; on a circuit board within the interior is provided with a pressing switch slot for connecting to the buttons; the characteristic of the invention is that the mouse buttons are designed as dynamic eyes such that the moving-eye buttons sway when using the mouse, thereby giving an entertaining effect.

3 Claims, 3 Drawing Sheets

AMELIORATION OF MOUSE BUTTON STRUCTURE

BACKGROUND OF THE INVENTION (a) Field of the Invention

The invention relates to an amelioration of a mouse button structure, and more particularly, to a structure that designs mouse buttons as moving eyes, such that the movements when using the mouse stimulate the bottom roller thereof, thereby swaying the "moving-eye" buttons with an entertaining effect. Furthermore, the amelioration of a mouse button structure accompanied with the shape of the mouse thereof may be further utilized in shape designs of animals, cartons or human bodies having ingenuity and originality.

(b) Description of the Related Art

A mouse is a common utensil in the computer peripherals. The operating principle and function thereof have presumably reached their limits after some years of improvement, and are not expected to have other breakthrough due to current related facilities in the short-term. Any probable amelioration that can be made most likely pertains to the entertaining effect in the shape and the degree of comfort for grasp. A prior computer mouse is usually provided in an arched body for an easy grasp, or has a streamline shape in a smooth and contour body, both lacking any entertaining effects. Or a prior mouse perhaps is an ergonomic concavo-convex body offering temporary amenity for grasp, however, the shape nevertheless strikes as geometric with unavoidable dreary visual effects. The prior simple and motionless form, especially, is somewhat too uninteresting to stimulate consumers' purchasing.

Suppose a mouse that combines entertaining dynamic buttons into an ergonomic structure is designed, it would not only provide convenience to the user, but also gives a feast for the mind when operating it; such mouse is the ultimate design that accommodates to the modern times.

SUMMARY OF THE INVENTION

Therefore, an object of the invention is to provide a mouse, without losing the fundamental structure, has an especially designed shape that offers dynamic and esthetical visual effects, and entertaining purposes, as well as being easy to assemble, thereby accomplishing the intention of stimulating consumers' purchasing.

To achieve the above object, the invention is completed by the method described below. An arched main body suitable for the grasp of the human hand is provided. On the main body are provided with at least two buttons, and at the top end are provided with two container having openings leading to an interior. On a circuit board within the interior is provided with a pressing switch slot for connecting to the buttons. The characteristic of the invention is that the mouse buttons are designed as dynamic eyes such that the movements when using the mouse cause the eyes to move, thus providing an entertaining effect.

To better understand of the contents of the present invention, detailed description shall be given in conjunction with the accompanying drawings.

DESCRIPTION OF THE PREFERRED EMBODIMENTS

Figure 1:
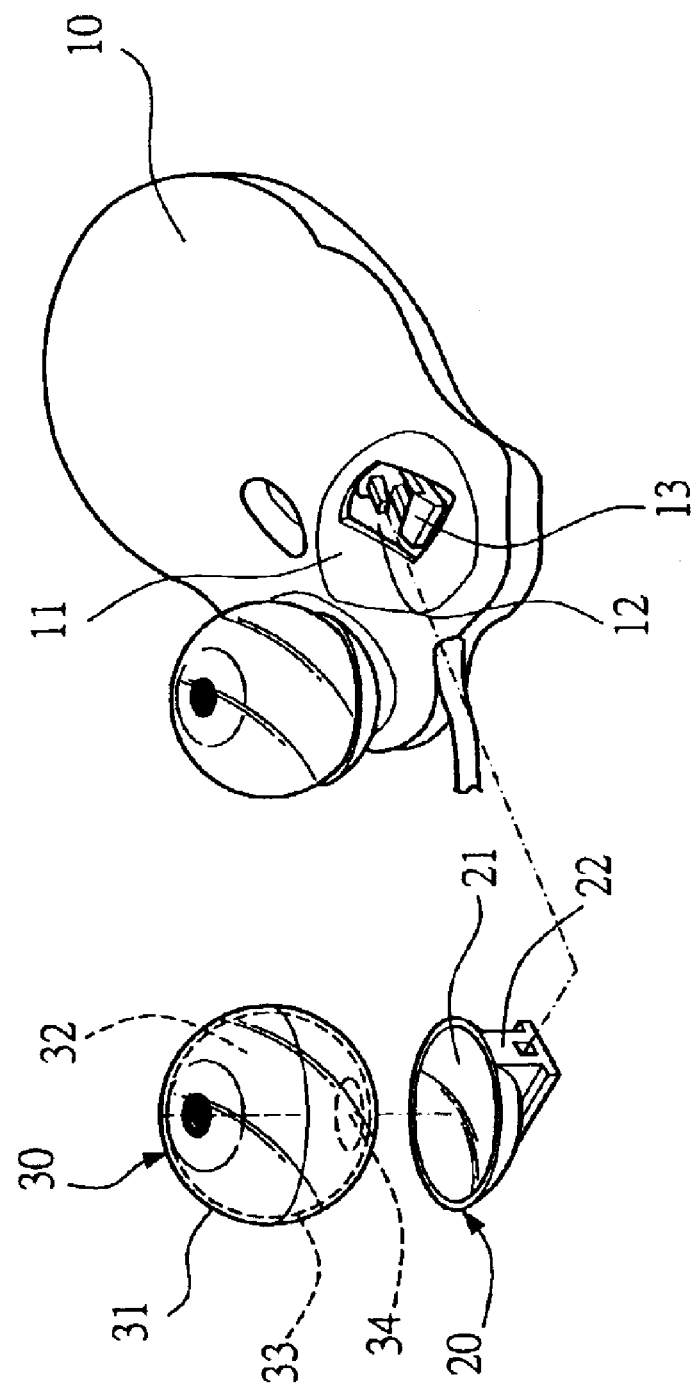
FIG. 1 is an exploded perspective view showing the structure according to the invention.
Figure 2:
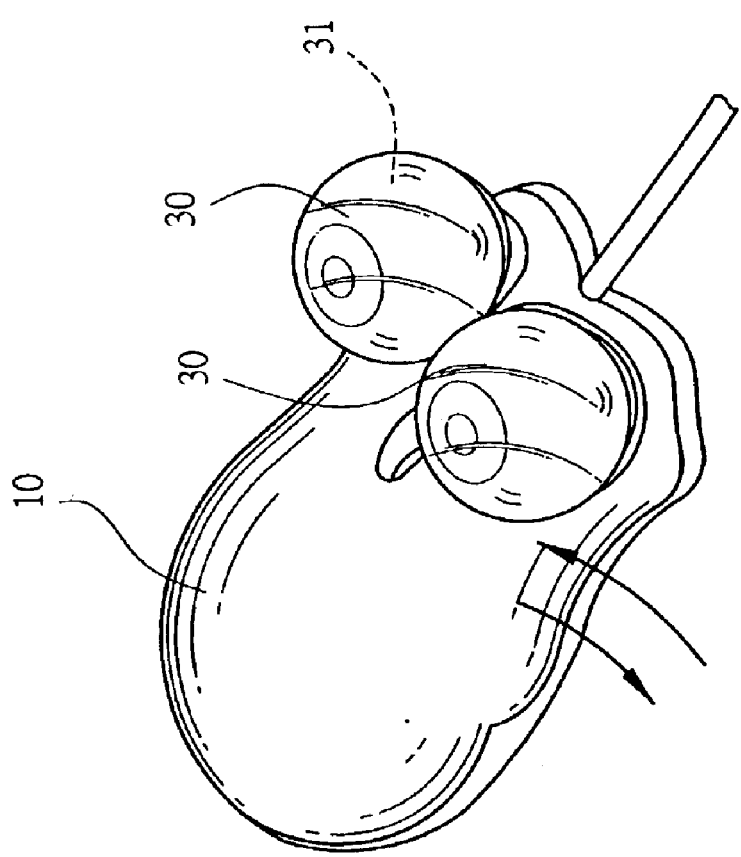
FIG. 2 is a perspective view showing the exterior of the combination according to the invention.
Figure 3:
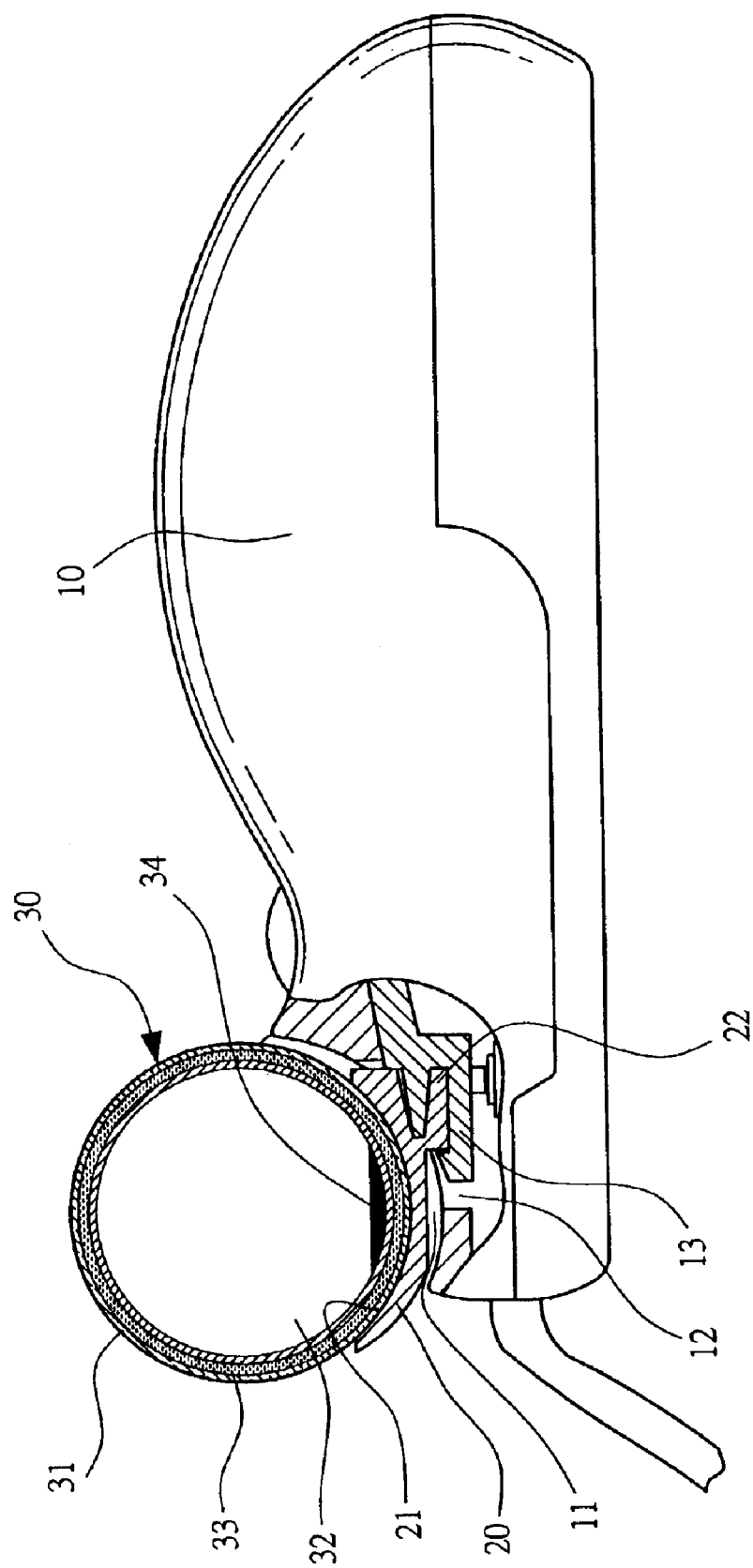
FIG. 3 is a cross-sectional view showing the structure according to the invention.

The structure in accordance with the invention provides an amelioration for mouse buttons, thus giving instant significant improvement in the visual aspect. Referring to FIGS. 1 and 2, the mouse structure in accordance with the invention comprises an arched main body 10 suitable for the grasp of the human hand. On the main body 10 are provided with at least two buttons, and at the top end of the main body 10 are provided with two containers 11 having openings 12 leading to the interior. On a circuit within the interior is provided with a pressing switch slot 13 for connecting to the buttons. The characteristic of the invention is that the mouse buttons are designed as dynamic eyes.

The button includes a pedestal 20 and a button body 30. The pedestal 20 therein is provided with a concave 21 on the top and an inserting element 22 corresponding to a slot 13. The button body 30 is provided with a spherical case 31 and a rotatable ball 32 having a smaller diameter within the interior. The rotatable ball 32 is provided with an eye graphic at one end and a small weight 34 at the other end. Between the spherical case 31 and the rotatable 32 is provided with a liquid 33 such that the rotatable ball 32 floats on the liquid in the spherical case 31, whereas the weight constantly stays at the bottom and the eye graphic constantly stays at the top. The structure above is utilized along with the shape of the mouse body 20 varied for matching the buttons, so that the mouse body 20 is transformed into a "big-eyed frog" or a "big-eyed octopus" having ingenuity and originality, thus giving the entertaining effect—the main characteristic of the invention.

When using the mouse provided by the present invention, the mouse is stimulated by the left-right movements, making the rotatable ball 32 sway within the spherical case 31, hence contributing the entertaining effect while the pair of "eyes" sway up-and-down. In addition, because the eyes are composed of the spherical cases 31, the fingers are able to press or click with minimal effort.

The present invention is designed with ingenuity and originality having the following advantages:

1. The invention provides a dynamic button structure, wherein an image of "animal eyes" is implied, giving an entertaining effect, which is also the main advantage of the invention.

2. The spherical buttons according to the invention enable the fingers to more easily control when pressing or clicking, which is another advantage of the invention.

The invention is a result of continual improvement and enthusiasm, as well as constant development and devotion. The invention provides not only an esthetical visual effect but also easy control when pressing or clicking, both add an entertaining effect and practicability, and conform to the criteria of a new type patent. Therefore, the application is brought forth with an expectation of given a new type patent with respect to the appended claims.

What is claimed is:

1. An mouse button structure comprising:
    a) a main body having:
        i) two containers, each of the two containers having an opening; and
        ii) a circuit having two pressing switch slots, each of the two pressing switch slots aligning with the opening of one of the two containers; and b) two buttons, each of the two buttons having:
  i) a pedestal having an inserting element connected to one of the two pressing switch slots and a concave;
  ii) a button body located in the concave and having a spherical ball and a rotatable ball located on an interior of the spherical ball, the rotatable ball having an eye graphic located on a periphery thereof and a weight located on the periphery opposite the eye graphic; and
  iii) a liquid located in the interior of the spherical ball between rotatable ball and the spherical ball.

2. The mouse button structure according to claim 1, wherein the mouse body has a shape representing a frog, the two buttons and the mouse body forming a big-eyed frog shape.

3. The mouse button structure according to claim 1, wherein the mouse body has a shape representing an octopus, the two buttons and the mouse body forming a big-eyed octopus shape.

* * * * *